United States Patent
Takahashi et al.

(10) Patent No.: US 10,202,496 B2
(45) Date of Patent: Feb. 12, 2019

(54) POLYVINYLIDENE FLUORIDE RESIN PARTICLES AND METHOD FOR PRODUCING SAME

(71) Applicant: TORAY INDUSTRIES, INC., Tokyo (JP)

(72) Inventors: Toshiya Takahashi, Nagoya (JP); Kei Makita, Nagoya (JP); Naoki Matsuda, Nagoya (JP); Koya Ito, Nagoya (JP); Yoshinori Kondo, Nagoya (JP); Yuji Echigo, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/039,270

(22) PCT Filed: Nov. 7, 2014

(86) PCT No.: PCT/JP2014/079541
§ 371 (c)(1),
(2) Date: May 25, 2016

(87) PCT Pub. No.: WO2015/083489
PCT Pub. Date: Jun. 11, 2015

(65) Prior Publication Data
US 2017/0051116 A1    Feb. 23, 2017

(30) Foreign Application Priority Data

Dec. 3, 2013 (JP) ................................. 2013-250091
Jun. 26, 2014 (JP) ................................. 2014-131237

(51) Int. Cl.
*C08J 3/14* (2006.01)
*H01M 6/18* (2006.01)
*C08J 3/12* (2006.01)

(52) U.S. Cl.
CPC ............... *C08J 3/14* (2013.01); *C08J 3/122* (2013.01); *C08J 2327/16* (2013.01)

(58) Field of Classification Search
USPC ........................................................ 526/255
See application file for complete search history.

(56) References Cited

U.S. PATENT DOCUMENTS

| | | | | |
|---|---|---|---|---|
| 5,364,929 A | * | 11/1994 | Dee | C08J 3/093 524/462 |
| 5,925,705 A | * | 7/1999 | Araki | C08F 14/22 524/317 |

(Continued)

FOREIGN PATENT DOCUMENTS

| | | |
|---|---|---|
| JP | 7-90153 A | 4/1995 |
| JP | 2003-082295 A * | 3/2003 |

(Continued)

OTHER PUBLICATIONS

Konno, "Synthesis of Monodisperse Polymer Particles in Soap-free Emulsion Polymerization," The Journal of the Society of Rubber Science and Technology, vol. 79, Japan, 2006, pp. 61-66, with a partial English translation (7 pages total provided).

(Continued)

*Primary Examiner* — Mark Kaucher
*Assistant Examiner* — Henry Hu
(74) *Attorney, Agent, or Firm* — Birch, Stewart, Kolasch & Birch, LLP (57) ABSTRACT

A production method of polyvinylidene fluoride resin particles comprising: (Process a1) a process to precipitate the polyvinylidene fluoride resin particles by adding a 100 mass % solution in total consisting of 75 to 99 mass % organic solvent, 1 to 25 mass % water and 0.5 to 15 mass % polyvinylidene fluoride resin to a poor solvent of the polyvinylidene fluoride resin; or (Process a2) a process to precipitate polyvinylidene fluoride resin particles by per- (Continued)

forming a flash-crystallization of the solution. With such a configuration, PVDF resin particles can be industrially produced by simple operations without using surfactant agent.

6 Claims, 1 Drawing Sheet

(56) References Cited

U.S. PATENT DOCUMENTS

| | | |
|---|---|---|
| 2001/0007889 A1 | 7/2001 | Araki et al. |
| 2002/0102464 A1* | 8/2002 | Yoshida ................ H01G 9/038 429/300 |
| 2004/0242755 A1 | 12/2004 | Araki et al. |
| 2006/0173117 A1 | 8/2006 | Araki et al. |
| 2013/0040096 A1* | 2/2013 | Iwato .................... G03F 7/0045 428/98 |

FOREIGN PATENT DOCUMENTS

| | | | |
|---|---|---|---|
| JP | 2003-82295 A | | 3/2003 |
| JP | 2011-177614 A | * | 9/2011 |
| JP | 2011-177614 A | | 9/2011 |
| JP | 2012-25836 A | | 2/2012 |

OTHER PUBLICATIONS

Toray Research Center, Inc., "Technical trend of polymer particles," 2008, with partial English translation thereof, 2 pages.

* cited by examiner

POLYVINYLIDENE FLUORIDE RESIN PARTICLES AND METHOD FOR PRODUCING SAME

TECHNICAL FIELD OF THE INVENTION

Our invention relates to polyvinylidene fluoride resin particles and a method for producing the same.

BACKGROUND ART OF THE INVENTION

Particles made of polyvinylidene fluoride resin (which may be called "PVDF resin") have characteristics such as excellent antiweatherability, contamination resistance, solvent resistance, water resistance and humidity resistance, and are suitably used as antifouling material and toner inside printers, or antiweatherable or water resistant resinous paint.

Patent documents 1 to 3 report how to produce PVDF resin particles. Patent document 1 discloses that fluororesin dissolved in polar organic solvent is dropped into water to prepare particles having a diameter from hundreds µm to some mm. Patent document 2 discloses that undiluted paint solution containing fluorine copolymer or the like is spray-dried to prepare particles having a diameter of dozens µm. Patent document 3 discloses that vinylidene fluoride monomer or mixture of monomers containing vinylidene fluoride is polymerized to emulsify in the presence of fluorochemical surfactant and nonionic surfactant to prepare aqueous dispersion liquid containing PVDF resin particles having a diameter of 200 nm or less.

Even with such methods of PVDF resin particles in which PVDF resin simply dissolved in good solvent is spray-dried or injected into poor solvent such as water, particle diameter could only be between dozens µm and some mm. To prepare particles of 200 nm or less, vinylidene fluoride monomer has to be polymerized to emulsify in the presence of surfactant agent which might prevent obtained PVDF resin particles from being pure. Particularly in the field such as medical field, electronic intelligence field and the next-generation battery field being important from a viewpoint of new energy, the purity is one of the most important issue and therefore materials should be surfactant-free.

The surfactant agent in the PVDF resin particles produced by the emulsion polymerization might deteriorate performances of electronic intelligence materials, medical materials or the like. Accordingly, the soap-free emulsification polymerization has been developed to prepare particles without using surfactant agent for producing liquid crystal spacer, conductive particles, copying toner or medical screening carrier, as disclosed in Non-patent documents 1 and 2. However, there has been no report of successful soap-free emulsification polymerization example to prepare PVDF resin particles.

On the other hand, electronic intelligence materials such as coating material and film have been acceleratingly required to be thinner. In this field, it is found that particles having a diameter of 1 micron or less should be used as a precursor for producing thin films.

Accordingly, it has been required to develop a simple mass producing method of PVDF resin particles of which diameter is uniformly 1 micron or less.

PRIOR ART DOCUMENTS

Patent Documents

Patent document 1: JP2011-177614-A
Patent document 2: JP2003-82295-A
Patent document 3: JP-H7-90153-A

Non-Patent Documents

Non-patent document 1: The Journal of THE SOCIETY OF RUBBER SCIENCE AND TECHNOLOGY, JAPAN 2006 (79) 61
Non-patent document 2: "Technical trend of polymer particles" 2008, TORAY Research Center, Inc.

SUMMARY OF THE INVENTION

Problems to be Solved by the Invention

It could be helpful to industrially produce PVDF resin particles by simple operations without using surfactant agent.

Means for Solving the Problems

We conceived our invention by investigating the above-described object to find that uniform-sized fine PVDF resin particles can be stably obtained by adding a PVDF resin solution of aqueous organic solvent to a substantially surfactant-free poor solvent of PVDF resin or by performing a flash-crystallization method to eject a PVDF resin solution of aqueous organic solvent into a substantially surfactant-free poor solvent of PVDF resin.

Namely, our invention is a production method of polyvinylidene fluoride resin particles comprising:
(Process a1) a process to precipitate the polyvinylidene fluoride resin particles by adding a 100 mass % solution in total consisting of 75 to 99 mass % organic solvent, 1 to 25 mass % water and 0.5 to 15 mass % polyvinylidene fluoride resin to a poor solvent of the polyvinylidene fluoride resin; or
(Process a2) a process to precipitate polyvinylidene fluoride resin particles by performing a flash-crystallization of the solution.

Both the Process a1 and Process a2 may be performed. For example, the solution may be ejected into the poor solvent of PVDF resin to carry out Process a1 and Process a2 at the same time.

Effect According to the Invention

Our invention makes it possible to easily and stably provide substantially surfactant-free PVDF resin particles having an average primary particle diameter of 300 nm or less, particularly 200 nm or less. Such PVDF resin particles can be applied to industrially useful materials although they have never been conventionally available industrially and stably. The PVDF resin particles obtained by our invention can be used for slash-molding material, rapid-prototyping or rapid-manufacturing material, paste-resin for plastic sol, powder-blocking material, powder-fluidity-improving material, lubricant, rubber-compounding agent, abrasive, thickener, filtering medium and filter aid, gelling agent, flocculant, painting additive, oil absorbent, mold release agent, slip-improving agent for plastic film sheet, blocking inhibitor, gloss control agent, mat-finish agent, light-diffusion agent, surface-hardness-improving agent, binder material, adhesive, coating agent, valve, cap, guide rail, roller, bolt, lining for manufacturing device of semiconductors or liquid crystalline products, modifier such as toughness-improving material, spacer for liquid crystal display device, chromatographic filler, aroma chemical or agrochemical holding agent, chemical catalyst and its support, gas adsorbent, sintered material for ceramic processing, standard particle for measurements and analyses, particles used for food industry field, powder-painting material, electronograph-developing toner, adhesive for lithium rechargeable battery separators or the like.

EMBODIMENTS FOR CARRYING OUT THE INVENTION

Hereinafter, embodiments of our invention will be explained in detail.
[PVDF Resin of Raw Material]
In this specification, PVDF resin means a resin which is defined by the following Chemical formula (1) and obtained by polymerizing vinylidene fluoride.

[Chemical formula 1]

(1)

The PVDF resin may be a commercially available product, such as KF polymer #1100, #1300, #1700, #7200, #7300, #8500, #9100, #9200, #9300 (made by KUREHA CORPORATION), Kynar 721, 741, 761, 461, 301F, HSV900, Kynar Flex 2851, 2801, 2821 (made by ARKEMA K.K.), Solef 1013, 1015, 21216, 31508, 6020 (made by Solvay Specialty Polymers Japan K.K.) and reagents made by Sigma-Aldrich Co. LLC.

The PVDF resin may be a homopolymer of polyvinylidene fluoride or a copolymer which includes another monomer component other than polyvinylidene fluoride and holds characteristics of PVDF resin. The monomer component other than polyvinylidene fluoride may be hydrocarbon-based vinyl monomer such as ethylene, propylene, isobutene and butadiene, fluorine-based vinyl monomer such as ethylene fluoride, ethylene trifluoride and ethylene tetrafluoride, carboxyl ester group-containing monomer such as acrylic acid methyl, acrylic acid ethyl, acrylic acid butyl, methyl methacrylate, methacrylate ethyl, methacrylate butyl, maleate methyl, maleate ethyl, maleate butyl, 2-carboxy ethyl acrylate, 2-carboxy ethyl methacrylate, acryloyloxy ethyl succinic acid, methacryloyloxy ethyl succinic acid, acryloyloxy ethyl phthalic acid, methacryloyloxy ethyl phthalic acid and trifluoromethyl acrylic acid, carboxyl group-containing monomer such as acrylic acid, methacrylic acid, maleic acid and maleate monomethyl, vinyl acetate and its saponified compound, propionate vinyl and its saponified compound, or butyric acid vinyl and its saponified compound. From a viewpoint of improving adhesiveness of PVDF resin, it is preferably carboxyl group-containing monomer component such as 2-carboxy ethyl acrylate, 2-carboxy ethyl methacrylate, acrylic acid, methacrylic acid, maleic acid, maleic acid monomethyl. Further from a viewpoint of industrial availability, it is more preferable to employ acrylic acid, methacrylic acid, maleic acid or maleic acid monomethyl, particularly preferably maleic acid or maleic acid monomethyl.

The monomer should be copolymerized to the extent allowed to hold characteristics of PVDF resin. The content should be 30 mol % or less relative to 100 mol % in total of the components. It is preferably 25 mol % or less, more preferably 20 mol %, further preferably 10 mol % or less, and particularly preferably 5 mol % or less.

The weight average molecular weight of the PVDF resin should be 1,000 or more. It is preferably 5,000 or more, more preferably 10,000 or more, further preferably 50,000, and particularly preferably 100,000 or more.

The weight average molecular weight of the PVDF resin should be 10,000,000 or less. It is preferably 5,000,000 or less, more preferably 3,000,000.

In this specification, the weight average molecular weight of the PVDF resin means a weight average molecular weight that is measured by gel permeation chromatography (GPC) using dimethyl formamide solvent and is converted into polystyrene weight.

The PVDF resin may be produced by a conventional method such as emulsification polymerization, precipitation polymerization and suspension polymerization. It is preferable that it is produced by a precipitation polymerization from a viewpoint of suppressing usage of surfactant agent. The form of the PVDF resin may be powder, granule, pellet or the like. From viewpoints of operability and dissolution time saving, the PVDF resin is preferably powdery.
[Production of PVDF Resin Particles]
In this example, PVDF resin particles can be produced from PVDF resin solution containing water and water-soluble organic solvent through Process a1 or Process a2.
[Precipitation Process]
Process a1: A process to precipitate PVDF resin particles by adding PVDF resin solution to substantially surfactant-free poor solvent.
Process a2: A process to precipitate PVDF resin particles by a flash-crystallization method ejecting PVDF resin solution to substantially surfactant-free poor solvent.

First, PVDF resin is dissolved in organic solvent. To prevent devices from corrosion because of coexisting inorganic ions when the PVDF resin particles are used as water-soluble paint or the like, it is preferable to employ inorganic ion-free powdery PVDF resin.

The organic solvent to dissolve the PVDF resin with should be a water-soluble solvent capable of dissolving the PVDF resin. Specifically, the solvent may be a kind selected from N-alkyl pyrrolidone such as N-methyl-2-pyrrolidinone (which may be called NMP), ureas such as 1,3-dimethyl-2-imidazolizinone (which may be called DMI), chain amide-based solvent such as N, N-dimethyl acetamide (which may be called DMAc) and N,N-dimethyl formamide (which may be called DMF), sulfur oxide-based polar solvent such as dimethyl sulfoxide (which may be called DMSO), dimethyl sulfone and tetramethylene sulfone, ketone-based solvent such as acetone and methyl ethyl ketone, and nitrile-based solvent such as acetonitrile and propionitrile. From viewpoints of stability and industrial handling of solvent, it is preferable to employ NMP, DMI, acetone, methyl ethyl ketone or acetonitrile, and is more preferable to employ NMP or acetonitrile.

It is preferable that oxygen gas concentration inside a dissolution tank is lowered so that the PVDF resin is prevented from decomposing or deteriorating while processes are performed safely. It is specifically preferable that the dissolution tank is provided under an inert gas atmosphere. The inert gas may be nitrogen gas, carbon dioxide gas, helium gas, argon gas or the like. From viewpoints of economy and availability, it is preferable to employ nitrogen gas, argon gas or carbon dioxide gas, preferably nitrogen gas or argon gas.

To prepare PVDF resin solution, PVDF resin, organic solvent and water may be stirred to dissolve in a container. In case that they are not dissolved at room temperature, they may be heated to dissolve.

After the PVDF resin dissolves in the organic solvent, water may be added. Concretely, water may be added after preparing the PVDF resin solution in a container. A water pump, a Komagome pipet or the like may be used to add water. It is preferable that water is gradually added in case that a large amount of water added at once might precipitate the PVDF resin which would take a long time to dissolve again. To prepare uniform sized PVDF resin particles, it is preferable that completely dissolved PVDF resin is added to a poor solvent or is subject to flash crystallization process, although the PVDF resin may contain some undissolved portion.

The water should be added by 0.5 to 40 mass % relative to organic solvent, preferably 1 to 25 mass %, although its amount depends on the PVDF resin concentration and the type of organic solvent. Too little amount of water might generate irregularly-shaped particles while too much amount of water might precipitate PVDF resin.

The PVDF resin is ordinarily dissolved at a temperature from room temperature to 200° C., preferably from room temperature to 100° C. or up to the boiling point of the organic solvent, although the preferable temperature range depends on the type of the solvent and the concentration of the PVDF resin.

The PVDF resin is ordinarily dissolved for 5 minutes to 50 hours, preferably 10 minutes to 40 hours, although the preferable time depends on the concentration of the PVDF resin and the dissolution temperature.

Too high concentration of the PVDF might cause adhesion between particles when the PVDF resin solution is added to a poor solvent to precipitate particles, so that fine particles or uniform sized particles might not be obtained.

Therefore the PVDF resin should ordinarily be added by 15 parts by weight or less relative to 100 parts by weight in total of organic solvent, water and PVDF resin when the PVDF resin solution is added to a surfactant-free poor solvent. It is preferable that it is added by 0.1 parts by weight to 10 parts by weight.

Such a range would be permissible for industrial production. After the PVDF resin is dissolved in the solvent, the PVDF resin solution is subject to the following precipitation process.

[Precipitation Process]
[Process a1]

In Process a1, the PVDF resin solution is added to the poor solvent of surfactant-free PVDF resin particles to precipitate PVDF resin particles.

To add the PVDF resin solution to the poor solvent of PVDF resin particles, the PVDF resin in a container can either be injected continuously or dropped into another container (which may be called "receiver tank") containing the poor solvent of PVDF resin. It is preferable that the PVDF resin solution is added directly to the poor solvent to prepare uniform sized fine particles, although it is possible that the PVDF resin solution is added through gas phase onto the poor solvent.

To prepare PVDF resin particles by blending the PVDF resin and poor solvent, there are two methods: the first continuous flow method (which may be called continuous method) and the second method (which may be called batch-wise method) in which particle generation liquid is prepared by adding the PVDF resin solution to the poor solvent in the receiver tank so that a batch of the particle generation liquid is supplied to the next process. The continuous flow method requires a reactor such as continuous stirred tank reactor (abbreviated as CSTR) and plug flow reactor (abbreviated as PFR). Both reactors can be applied for particle generation of the PVDF resin.

When the CSTR is used, the poor solvent is poured into the receiver tank (which may be called reactor for the continuous method) to blend with the PVDF resin solution to prepare PVDF resin particles, and then the PVDF resin solution and poor solvent are simultaneously dropped onto the fine particle generation liquid while the PVDF resin particle generation liquid is continuously sampled from the receiver tank to generate particles continuously. It is also possible that the PVDF resin solution and poor solvent are simultaneously dropped onto the PVDF resin particle generation liquid prepared by the batch-wise method while the PVDF resin particle generation liquid is continuously sampled from the receiver tank to prepare the particle generation liquid.

When the CSTR is used, it is necessary to drop the PVDF resin solution and poor solvent at the same time. From a viewpoint of productivity, it is preferable that a drip rate ratio of PVDF resin solution to poor solvent is 0.1 to 100, preferably 0.2 to 50, although it shouldn't be limited to the ranges as far as the PVDF resin particles are generated.

It is preferable that a residence time, which is defined as ratio of weight of the particle generation liquid in the receiver tank to mass flow rate of the particle generation liquid sampled from the receiver tank (reactor), is 1 second to 10 hours, preferably 1 minute to 1 hour, although it shouldn't be limited to the ranges as far as uniform sized fine particles are prepared.

The receiver tank may be provided with a blending device to keep homogeneity of the particle generation liquid. The blending device may be stirrer blade, biaxial mixing machine, homogenizer, ultrasonic irradiation device or the like.

When the PFR is used, various pipes can be used to flow the PVDF resin solution and poor solvent at a constant rate to blend them to prepare particle generation liquid to be continuously sampled. When two pipes are used, it is possible that the PVDF resin solution is flowed in an inner pipe and the poor solvent is flowed in an outer pipe at a constant rate so that the PVDF resin solution and poor solvent are blended in the outer pipe to generate particles. Alternatively, it is possible that the PVDF resin solution is flowed in the outer pipe and the poor solvent is flowed in the inner pipe.

When a T-shaped pipe is used to continuously generate particles, it is possible that the poor solvent is flowed perpendicularly to the flow of PVDF resin solution to blend them to generate particles.

Thus various pipes can be used to blend the PVDF resin solution and poor solvent to continuously generate particles, although there are some possible ways other than the above-described methods using the PFR.

When the PFR is used, it is preferable that a flow rate ratio of the PVDF resin solution to the poor solvent is 0.1 to 100, preferably 0.2 to 50 from a viewpoint of productivity, although it shouldn't be limited to the ranges as far as PVDF resin particles are generated.

The blending part of PVDF resin solution and poor solvent may be provided with a pipe only or a pipe-shaped blending device. The pipe-shaped blending device may include the above-described blending device or a static blending structure such as static mixer.

The PVDF resin solution should be blended with the poor solvent for a time within the same range as the residence time range. From a viewpoint of productivity, it is preferable that the pipe has an inner diameter of 0.1 mm to 1 m, preferably 1 mm to 1 m, although it shouldn't be limited to the ranges as far as the PVDF resin solution is blended with the poor solvent.

When two pipes are used as inner pipe and outer pipe, it is preferable that a ratio (inner pipe diameter/outer pipe diameter) of the inner pipe diameter to the outer pipe diameter is 1.1 to 500, preferably 1.1 to 100, although it shouldn't be limited to the ranges as far as particle generation liquid is prepared.

The poor solvent of the PVDF resin particles may be aliphatic hydrocarbon-based solvent such as pentane, hexane, heptane, octane, nonane and decane, aromatic hydrocarbon-based solvent such as benzene, toluene, o-xylene, m-xylene, p-xylene and naphthalene, ester-based solvent such as ethyl acetate, methyl acetate, butyl acetate and propionate butyl, ether-based solvents such as diethyl ether, diisopropyl ether, tetrahydrofuran and dioxane, alcohol-based solvent such as methanol, ethanol, 1-propanol and 2-propanol, water, or the like. It is preferable to employ water or alcohol-based solvent such as methanol, ethanol, 1-propanol and 2-propanol, preferably water, methanol or ethanol.

From a viewpoint of uniform dispersion of PVDF resin particles in the poor solvent, it is preferable that the poor solvent of PVDF resin can homogeneously intermix the organic solvent employed for dissolution. When blended solvents which have been still standing for 1 day don't make an interface, you can say the solvents can homogeneously intermix each other. For example, water can homogeneously intermix a solvent such as NMP, DMF, DMAc, acetone, DMSO, tetrahydrofuran, acetonitrile, methanol and ethanol.

To obtain fine uniform-sized particles, it is preferable that the poor solvent of PVDF resin is a water-containing blended solvent such as water-alcohol and water-nitrile blended solvent, although sole solvent or blended solvents can be employed as far as the poor solvent homogeneously intermixes the organic solvent.

It is possible that the poor solvent of PVDF resin is dissolved with 1 part by weight of the solvent by 0.1 to 100 parts by weight, preferably 0.1 to 50 parts by weight and further preferably 0.1 to 10 parts by weight.

The poor solvent of PVDF resin used in a precipitation process is substantially surfactant-free. It is preferable that the poor solvent is entirely surfactant-free, although it may contain surfactant to the extent of keeping the effect of our invention. Specifically, content of the surfactant relative to the PVDF resin should be 3 mass % or less, preferably less than 1 mass % as far as possible.

Temperature of the receiver tank in which the PVDF resin solution is blended with the poor solvent of PVDF resin can be set from 0° C. to the boiling point of the solvent. It is preferable that the temperature before blending is 0 to 40° C. in case that a certain solvent might cause a fusion-bonding between particles not to be able to prepare particles. With such a blending PVDF resin particles precipitate from the PVDF resin solution to prepare a liquid in which PVDF resin particles are dispersed or suspended. It is preferable that the poor solvent of PVDF resin is stirred before adding the PVDF resin solution.

[Process a2]

In Process a2, the PVDF resin solution is dissolved and subject to a flash crystallization to precipitate PVDF resin particles.

The flash crystallization is a method to solidify or crystallize the PVDF resin solution rapidly, in which the solution under increased pressure or under increased temperature and pressure is ejected through a nozzle into another container (which may be called another receiver tank) of which pressure (which may be a negative pressure) is less than the increased pressure and of which temperature (which may be less than room temperature) is less than the boiling point of the organic solvent for dissolution in addition to the pressure less than the increased pressure.

It is preferable that the flash crystallization is performed by ejecting the PVDF resin solution into the poor solvent. It is preferable that the flash crystallization is performed while the tip of nozzle to eject the PVDF resin solution is sunk in the poor solvent at the receiver tank, although the tip of nozzle can be above the poor solvent to perform the flash crystallization into the poor solvent through gas phase.

More concretely, it is preferable that the flash crystallization is performed by ejecting the PVDF resin solution toward the receiver tank at atmospheric pressure (or negative pressure) from the container held at increased pressure or increased temperature in addition to the increased pressure. For example of the dissolution process, when the dissolution is performed at increased temperature in pressure tight container such as autoclave, the inner pressure of the container is increased by heating, and it is possible to further increase the pressure with inert gas such as nitrogen. And then, the pressure can be discharged to the receiver tank at atmospheric pressure so that the flash crystallization is performed easily. When the dissolution is performed at room temperature, the flash crystallization can be performed by pressurizing the dissolution tank and ejecting the content toward the poor solvent of PVDF resin to prepare PVDF resin particles.

The poor solvent used for the flash crystallization is not limited to some kinds, and may be the same poor solvent as explained for the Process a1.

The poor solvent of PVDF resin may be used by 0.1 to 100 parts by weight relative to 1 part by weight of solvent used for dissolution although it shouldn't be limited to the range. It is preferable that it is 0.2 to 50 parts by weight, preferably 0.3 to 10 parts by weight.

The flash crystallization may be operated by a single stage of flash crystallization in which the solution dissolved at room temperature to 200° C., preferably room temperature to 100° C., is ejected into a container at a pressure which may be negative pressure or less than the increased pressure. Alternatively, it may be operated as multistage flash crystallization ejecting the solution from a tank to a container at a pressure less than that of the tank. Concretely, in the dissolution process when the dissolution is performed at increased temperature in pressure tight container such as autoclave, the inner pressure of the container is increased by heating, and it is possible to further increase the pressure with inert gas such as nitrogen. The solution at the increased pressure in the container may be ejected toward the receiver tank containing the poor solvent of PVDF resin at atmospheric pressure or ejected toward the receiver tank at a negative pressure. When the dissolution is performed without heating in the pressure tight container such as autoclave, it is possible that the solution is pressurized to an increased pressure and ejected toward the receiver tank containing the poor solvent of PVDF resin at atmospheric pressure or a negative pressure. It is preferable that the solution to be subject to the flash crystallization has a pressure (gauge pressure) of 0.2 to 4 MPa. It is preferable that the solution in such a condition is ejected toward the receiver tank at atmospheric pressure for the flash crystallization.

Depending on the poor solvent of PVDF resin contained in the receiver tank, it is preferable that the receiver tank is kept at a temperature which doesn't cause a solidification of the poor solvent of PVDF resin and is 50° C. or less. For water as the poor solvent, it is preferable to be 0 to 50° C.

It is preferable that the outlet of pipe connected to the dissolution tank is provided in the poor solvent of PVDF resin so that fine PVDF resin particles are prepared, although it is possible that the outlet is provided in the air above the solvent in the tank.

Through the precipitation processes (Process a1) and (Process a2) PVDF resin particles can be obtained as dispersion liquid or suspension liquid. Hereinafter, such dispersion liquid and suspension liquid may be called flash liquid. Coarse particles of undissolved PVDF resin or the like contaminated therein can be removed with filtration or the like.

Thus surfactant-free and uniform-sized fine particles can be prepared stably.

[Filtration/Isolation Process]

To isolate PVDF resin particles, a conventionally well-known solid-liquid separation method such as filtration, centrifugal separation and centrifugal filtration can be performed. It is preferable that particles are aggregated to increase apparent particle diameters and then a solid-liquid separation such as filtration and centrifugal separation is performed so that fine PVDF resin particles of which average primary particle diameter is 300 nm or less are isolated efficiently. To increase apparent particle diameters by aggregation, heating or using flocculant for salting-out or the like may be employed. It is preferable that the salting-out method is employed to obtain aggregate in a short time. It is preferable that the aggregate has an average particle diameter of 5 to 100 μm.

The salting-out aggregation method can prepare aggregate of great particle diameters by adding inorganic salt such as sodium chloride of 0.01 to 1,000 parts by weight, preferably 0.05 to 500 parts by weight, relative to 1 part by weight of PVDF resin particle. Specifically, solid or solution of 0.1 to 20 parts by weight of the inorganic salt may be added to the dispersion liquid or suspension liquid. The inorganic salt may be sodium chloride, magnesium chloride, calcium chloride, lithium chloride, potassium chloride, sodium acetate, acetic acid magnesium, calcium acetate, oxalic acid sodium, oxalic acid magnesium, calcium oxalate, sodium citrate, magnesium citrate, citric acid calcium or the like. It is preferable that the inorganic salt is dissolved with water. It is preferable that the content of the inorganic salt added to the particles is 0.05 or more parts by weight relative to 1 part by weight of PVDF resin particles while the upper limit is saturation amount of dissolution with the poor solvent to precipitate PVDF resin particles. The PVDF resin particles can be aggregated by such a method so that solid-liquid separation is easily performed.

The liquid-solid separation method may be filtration, centrifugal separation or the like. A membrane filter or filter cloth can be used to perform filtration while a filter cloth can be used to perform centrifugal separation. The opening of filter should be decided depending on particle size of target PVDF resin particles. It is possible to employ a membrane filter having an opening of 0.1 to 50 μm and a filter cloth having an air permeability of 5 cm$^3$/cm$^2$ sec or less at 124.5 Pa.

Thus obtained PVDF resin particles can be used for various uses although the PVDF resin particles may be dispersed with any solvent to prepare a dispersion liquid or re-dispersed with another medium to prepare a complex.

Thus obtained surfactant-free PVDF resin particles have an average primary particle diameter of 300 nm or less, preferably 200 nm or less. The lower limit is around 30 nm. Further, uniform-sized particles having coefficient of variance of 40% or less can be prepared usually. It is preferable that the coefficient of variance is 30% or less, preferably 20%, more preferably 18% or less, and particularly preferably 15% or less.

The average primary particle diameter of PVDF resin particles is calculated by averaging the longest lengths of 100 particles randomly selected in an image of scanning electron microscope.

The Coefficient of Variance (CV) indicating uniformity of PVDF resin particle size is calculated according to the following formulae (1) to (3) from length data measured for calculating the average primary particle diameter.

[Formula 1]

$$\sigma^2 = \frac{1}{N}\sum_{i=1}^{N}(X_i - \overline{X})^2 \quad \text{(Variance)} \quad \text{Formula (1)}$$

$X$: Particle diameter
$\overline{X}$: Average particle diameter
$N$: Number of measured data $$\sigma = \sqrt{(\sigma)^2} \quad \text{(Standard deviation)} \quad \text{Formula (2)}$$

$$CV = \sigma/\overline{X} \quad \text{(Coefficient of Variance)} \quad \text{Formula (3)}$$

From a viewpoint of industrial use, it is preferable that the PVDF resin particles are solid, although they may be solid or hollow. The cross-section of particle can be observed with a transmission electron microscope to see if the PVDF resin particle is solid.

Thus obtained PVDF resin particles are characterized in a submicron-sized average primary particle diameter, narrow particle diameter distribution and small amount of surfactant content.

Such PVDF resin particles can precisely be applied to film, porous membrane, die surface or the like, to form a uniform and thin adhesion film thereon. Because the PVDF resin particles contain surfactant by a small amount, the adhesion film is industrially useful as being excellent in adhesion strength.

Thus prepared PVDF resin particles are applicable to various industrial used usefully and practically. Specifically, they may be used as additive for toner, rheology modifier such as paint, medical diagnostic study agent, mechanical property improving agent for molded products such as car material and architectural material, mechanical property improving material such as film and fiber, resin molding raw material such as rapid prototyping and rapid manufacturing, slash-molding material, paste-resin for plastic sol, powder-blocking material, powder-fluidity-improving material, lubricant, rubber-compounding agent, abrasive, thickener, filtering medium and filter aid, gelling agent, flocculant, painting additive, oil absorbent, mold release agent, slip-improving agent for plastic film sheet, blocking inhibitor, gloss control agent, mat-finish agent, light-diffusion agent, modifiers such as surface-hardness-improving agent and toughness-improving material, spacer for liquid crystal display device, chromatographic filler, matrix and additive for cosmetic foundation, medical material such as assistant for microcapsules, drug delivery system and diagnostic agent, aroma chemical or agrochemical holding agent, chemical catalyst and its support, gas adsorbent, sintered material for ceramic processing, standard particle for measurements and analyses, particles used for food industry field, powder-painting material, electronograph-developing toner or the like.

EXAMPLES

[Measurement of Average Primary Particle Diameter]

The average primary particle diameter of PVDF resin particles in Examples is calculated by averaging the longest lengths of 100 particles randomly selected in an image of scanning electron microscope JEOL JMS-6700F made by JEOL Ltd.

[Calculation of Coefficient of Variance of PVDF Resin Particles]

The Coefficient of Variance (CV) of PVDF resin particles in Examples is calculated by the above-described formulae (1) to (3) from each particle diameter of 100 particles randomly selected in an image of scanning electron microscope JEOL JMS-6700F made by JEOL Ltd.

[Measurement of Molecular Weight of PVDF Resin]

The weight average molecular weight of PVDF resin is calculated by the gel permeation chromatography method with a calibration curve with polystyrene.

Devices: LC-10A series made by Shimadzu Corporation
Column: 2 pieces of GF-7MHQ made by Showa Denko K.K.
Moving phase: Dimethyl formamide
Flow rate: 1.0 ml/min
Detector: Differential refractometer
Column temperature: 40° C.

[Measurement of Average Particle Diameter]

The measurement is performed with a laser diffraction/dispersion type particle size distribution measuring equipment MT3300EXII made by Nikkiso Co., Ltd. using a disperse media of 0.5 wt % polyoxyethylene cumylphenylether solution (Nonal 912A made by Toho Chemical Industry Co., Ltd.). Specifically, the average particle diameter of particle is determined by a median diameter (d50) at which cumulative volume percentage is 50% in a cumulative particle volume distribution curve obtained from a laser dispersion analysis result by the Microtrac method.

Example 1

7.8 g of PVDF resin made by Sigma-Aldrich Co. LLC. was dissolved with 534 g of NMP made by Mitsubishi Chemical Corporation at 80° C. and then 66 g of water was added to it to prepare PVDF resin solution. The solution kept at 80° C. was continuously added to a particle generation tank (receiver tank) containing 600 g of water at 80° C. 7.8 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 98 nm and Coefficient of Variance of 14.9%. Table 1 shows the result.

TABLE 1

| | PVDF | | | Dissolution temperature [° C.] | Moisture percentage [wt %] | Particle generation temperature [° C.] | Poor solvent | Solution/ Poor solvent | Particle diameter [nm] | Coefficient of Variance [%] |
|---|---|---|---|---|---|---|---|---|---|---|
| | Resin kind | Conc. [wt %] | Solvent | | | | | | | |
| Example 1 | Reagent made by Aldrich Inc. | 1.3 | NMP | 80 | 11 | 80 | Water | 1 | 98 | 14.9 |
| Example 2 | Reagent made by Aldrich Inc. | 1.5 | NMP | 80 | 11 | Room temp. | Water | 1 | 100 | 15.2 |
| Example 3 | Reagent made by Aldrich Inc. | 2 | NMP | 80 | 11 | 80 | Water | 1 | 99 | 15.4 |
| Example 4 | Reagent made by Aldrich Inc. | 2 | NMP | 80 | 11 | Room temp. | Water | 1 | 102 | 15.1 |
| Example 5 | Reagent made by Aldrich Inc. | 3 | NMP | 80 | 15 | 80 | Water | 1 | 105 | 15.6 |
| Example 6 | KF polymer #9300 | 1 | Acetonitrile | 80 | 10 | Room temp. | Water | 1 | 103 | 18.1 |
| Example 7 | KF polymer #9300 | 1 | Acetonitrile | 80 | 10 | Room temp. | MeOH/Water = 9/1 | 1 | 97 | 14.4 |
| Example 8 | KF polymer #9300 | 1 | Acetonitrile | 80 | 10 | Room temp. | MeOH/Water = 7/3 | 1 | 104 | 15.5 |
| Example 9 | KF polymer #9300 | 1 | Acetonitrile | 80 | 10 | Room temp. | MeOH/Water = 5/5 | 1 | 107 | 18.5 |
| Example 10 | KF polymer #9300 | 1 | Acetonitrile | 80 | 10 | Room temp. | MeOH/Water = 2/8 | 1 | 105 | 18.0 |
| Example 11 | KF polymer #9300 | 1 | Acetonitrile | 80 | 10 | Room temp. | $CH_3CN$/Water = 5/95 | 1 | 109 | 15.2 |
| Example 12 | KF polymer #9300 | 1 | Acetonitrile | 80 | 10 | Room temp. | Water | 2 | 118 | 16.0 |
| Example 13 | KF polymer #9300 | 1 | Acetonitrile | 80 | 5 | Room temp. | Water | 1 | 111 | 18.2 |
| Example 14 | KF polymer #9300 | 1 | Acetonitrile | 80 | 3 | Room temp. | Water | 1 | 114 | 18.7 |
| Example 15 | KF polymer #8500 | 1 | Acetonitrile | 80 | 10 | Room temp. | Water | 1 | 118 | 17.3 |
| Example 16 | KF polymer #8500 | 2 | NMP | 80 | 10 | Room temp. | Water | 1 | 123 | 16.6 |
| Example 17 | KF polymer #8500 | 2 | Acetonitrile | 80 | 10 | Room temp. | Water | 1 | 121 | 16.3 |

TABLE 1-continued

| | PVDF | | | Dissolution temperature [° C.] | Moisture percentage [wt %] | Particle generation temperature [° C.] | Poor solvent | Solution/ Poor solvent | Particle diameter [nm] | Coefficient of Variance [%] |
| --- | --- | --- | --- | --- | --- | --- | --- | --- | --- | --- |
| | Resin kind | Conc. [wt %] | Solvent | | | | | | | |
| Comparative Example 1 | Reagent made by Aldrich Inc. | 3 | NMP | 80 | 0 | 80 | Water | 1 | Fusion-bonded strings | — |
| Comparative Example 2 | KF polymer #8500 | 2 | NMP | 80 | 0 | Room temp. | Water | 1 | Fusion-bonded strings | — |

Example 2

9 g of PVDF resin made by Sigma-Aldrich Co. LLC. was dissolved with 510 g of NMP made by Mitsubishi Chemical Corporation at 80° C. and then 90 g of water was added to it to prepare PVDF resin solution. The solution kept at 80° C. was continuously added to a particle generation tank containing 600 g of water at room temperature. 9 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 100 nm and Coefficient of Variance of 15.2%. Table 1 shows the result.

Example 3

Figure 1:
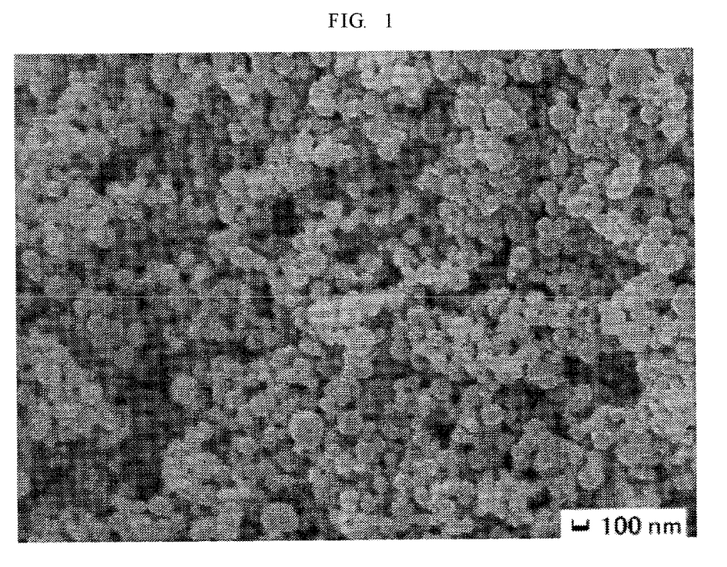
FIG. 1 is a scanning electron microscope image showing PVDF resin particles produced by a method according to an example of the present invention.

12 g of PVDF resin made by Sigma-Aldrich Co. LLC. was dissolved with 534 g of NMP made by Mitsubishi Chemical Corporation at 80° C. and then 66 g of water was added to it to prepare PVDF resin solution. The solution kept at 80° C. was continuously added to a particle generation tank containing 600 g of water at 80° C. 12 g of 10 wt % magnesium acetate solution was added to the mixture liquid to aggregate PVDF resin particles. The aggregate was filtrated with membrane filter and washed with water to obtain aqueous wet cake of the PVDF resin particles. The cake was observed with a scanning electron microscope (SEM) to find the average primary particle diameter of 99 nm and Coefficient of Variance of 15.4%. Table 1 shows the result. FIG. 1 depicts an image taken by the SEM observation.

Example 4

12 g of PVDF resin made by Sigma-Aldrich Co. LLC. was dissolved with 534 g of NMP made by Mitsubishi Chemical Corporation at 80° C. and then 66 g of water was added to it to prepare PVDF resin solution. The solution kept at 80° C. was continuously added to a particle generation tank containing 600 g of water at room temperature. 12 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 102 nm and Coefficient of Variance of 15.1%. Table 1 shows the result.

Example 5

18 g of PVDF resin made by Sigma-Aldrich Co. LLC. was dissolved with 510 g of NMP made by Kanto Chemical Co., Inc. at 80° C. and then 90 g of water was added to it to prepare PVDF resin solution. The solution kept at 80° C. was continuously added to a particle generation tank containing 600 g of water at 80° C. 18 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 105 nm and Coefficient of Variance of 15.6%. Table 1 shows the result.

Example 6

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 600 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 103 nm and Coefficient of Variance of 18.1%. Table 1 shows the result.

Example 7

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously dropped onto a particle generation tank containing 540 g of methanol and 60 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 97 nm and Coefficient of Variance of 14.4%. Table 1 shows the result.

Example 8

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 420 g of methanol and 180 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 104 nm and Coefficient of Variance of 15.5%. Table 1 shows the result.

Example 9

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. of the solution was continuously added to a particle generation tank containing 300 g of methanol and 300 g of water at room temperature, and then 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 107 nm and Coefficient of Variance of 18.5%. Table 1 shows the result.

Example 10

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 120 g of methanol and 480 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 105 nm and Coefficient of Variance of 18.5%. Table 1 shows the result.

Example 11

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 30 g of Acetonitrile and 570 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 109 nm and Coefficient of Variance of 15.2%. Table 1 shows the result.

Example 12

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 300 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 118 nm and Coefficient of Variance of 16.0%. Table 1 shows the result.

Example 13

6 g of KF polymer #9300 made by Kureha Corporation was dissolved with 570 g of Acetonitrile made by Kanto Chemical Co., Inc. at 80° C. and then 30 g of water was added to it to prepare the PVDF resin solution. The solution kept at 76° C. was continuously added to a particle generation tank containing 600 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 111 nm and Coefficient of Variance of 18.2%. Table 1 shows the result.

Example 14

6 g of KF polymer #9300 made by Kureha Corporation was dissolved with 582 g of Acetonitrile made by Kanto Chemical Co., Inc. at 80° C. and then 18 g of water was added to it to prepare the PVDF resin solution. The solution kept at 76° C. was continuously added to a particle generation tank containing 600 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 114 nm and Coefficient of Variance of 18.7%. Table 1 shows the result.

Example 15

6 g of KF polymer #8500 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 600 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 118 nm and Coefficient of Variance of 17.3%. Table 1 shows the result.

Example 16

12 g of KF polymer #8500 made by Kureha Corporation was dissolved with 540 g of NMP made by Mitsubishi Chemical Corporation at 80° C. and then 60 g of water was added to it to prepare the PVDF resin solution. The solution kept at 80° C. was continuously added to a particle generation tank containing 600 g of water at room temperature. 6 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 123 nm and Coefficient of Variance of 16.6%. Table 1 shows the result.

Example 17

12 g of KF polymer #8500 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 600 g of water at room temperature. 12 g of 10 wt % magnesium acetate solution was added to the mixture liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 121 nm and Coefficient of Variance of 16.3%. Table 1 shows the result.

Example 18

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 300 g of water at room temperature. Then, 606 g of separately prepared PVDF resin solution (76° C.) and 300 g of water (room temperature) were simultaneously dropped into the particle generation tank at the drip rate for finishing each drip in 6 minutes while 906 g of particle generation liquid (Particle generation liquid A) was sampled from the bottom of the particle generation tank so that the particle generation liquid level was kept constant. Next, 606 g of separately prepared PVDF resin solution (76° C.) and 300 g of water (room temperature) were simultaneously dropped into the particle generation tank at the drip rate for finishing each drip in 6 minutes while 906 g of particle generation liquid (Particle generation liquid B) was sampled from the bottom of the particle generation tank so that the particle generation liquid level was kept constant. 6 g of 10 wt % magnesium acetate solution was added to each of particle generation liquids A and B as well as particle generation liquid C still left in the particle generation tank to aggregate PVDF resin particles, which was filtrated with membrane filter and washed with water to obtain aqueous wet cake of the PVDF resin particles. The cakes were observed with a scanning electron microscope (SEM) to find: the average primary particle diameter of 120 nm and Coefficient of Variance of 16.6% for particle generation liquid A; the average primary particle diameter of 119 nm and Coefficient of Variance of 16.8% for particle generation liquid B; the average primary particle diameter of 122 nm and Coefficient of Variance of 17.0% for particle generation liquid C. Table 2 shows the result.

TABLE 2

| | PVDF | | | Dissolution temperature [° C.] | Moisture percentage [wt %] | Particle generation temperature [° C.] | Poor solvent | Solution/ Poor solvent | Particle diameter [nm] | Coefficient of Variance [%] |
|---|---|---|---|---|---|---|---|---|---|---|
| | Resin kind | Conc. [wt %] | Solvent | | | | | | | |
| Example 18 | KF polymer #9300 | 1 | Acetonitrile | 80 | 10 | Room temp. | Water | 2/1 | Particle generation liquid A: 120 Particle generation liquid B: 119 Particle generation liquid C: 122 | Particle generation liquid A: 16.6 Particle generation liquid B: 16.8 Particle generation liquid C: 17.0 |
| Example 19 | KF polymer #9300 | 1 | Acetonitrile | 80 | 10 | Room temp. | Water | 3/1 | Particle generation liquid A: 121 Particle generation liquid B: 120 Particle generation liquid C: 123 | Particle generation liquid A: 16.8 Particle generation liquid B: 16.9 Particle generation liquid C: 17.2 |
| Example 20 | KF polymer #9300 | 1.35 | Acetonitrile | 80 | 10 | Room temp. | 5 wt % acetonitrile aqueous solution | 1/1 | Particle generation liquid A: 123 Particle generation liquid B: 124 Particle generation liquid C: 124 | Particle generation liquid A: 16.9 Particle generation liquid B: 16.9 Particle generation liquid C: 17.0 |

Example 19

6 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 200 g of water at room temperature.

Then, 606 g of separately prepared PVDF resin solution (76° C.) and 200 g of water (room temperature) were simultaneously dropped into the particle generation tank at the drip rate for finishing each drip in 6 minutes while 806 g of particle generation liquid (Particle generation liquid A) was sampled from the bottom of the particle generation tank so that the particle generation liquid level was kept constant. Next, 606 g of separately prepared PVDF resin solution (76° C.) and 200 g of water (room temperature) were simultaneously dropped into the particle generation tank at the drip rate for finishing each drip in 6 minutes while 806 g of particle generation liquid (Particle generation liquid B) was sampled from the bottom of the particle generation tank so that the particle generation liquid level was kept constant. 6 g of 10 wt % magnesium acetate solution was added to each of particle generation liquids A and B as well as particle generation liquid C still left in the particle generation tank to aggregate PVDF resin particles, which was filtrated with membrane filter and washed with water to obtain aqueous wet cake of the PVDF resin particles. The cakes were observed with a scanning electron microscope (SEM) to find: the average primary particle diameter of 121 nm and Coefficient of Variance of 16.8% for particle generation liquid A; the average primary particle diameter of 120 nm and Coefficient of Variance of 16.9% for particle generation liquid B; the average primary particle diameter of 123 nm and Coefficient of Variance of 17.2% for particle generation liquid C. Table 2 shows the result.

Example 20

8.1 g of KF polymer #9300 made by Kureha Corporation was dissolved with 540 g of Acetonitrile made by Kanto Chemical Co., Inc. at 80° C. and then 60 g of water was added to it to prepare the PVDF resin solution. The solution kept at 76° C. was continuously added to a particle generation tank containing 600 g of 5 wt % Acetonitrile at room temperature.

Then, 608.1 g of separately prepared PVDF resin solution (76° C.) and 600 g of 5 wt % Acetonitrile (room temperature) were simultaneously dropped into the particle generation tank at the drip rate for finishing each drip in 6 minutes while 1,200 g of particle generation liquid (Particle generation liquid A) was sampled from the bottom of the particle generation tank so that the particle generation liquid level was kept constant. Next, 606 g of separately prepared PVDF resin solution (76° C.) and 600 g of 5 wt % Acetonitrile (room temperature) were simultaneously dropped into the particle generation tank at the drip rate for finishing each drip in 6 minutes while 1,200 g of particle generation liquid (Particle generation liquid A) was sampled from the bottom of the particle generation tank so that the particle generation liquid level was kept constant. 6 g of 10 wt % magnesium acetate solution was added to each of particle generation liquids A and B as well as particle generation liquid C still left in the particle generation tank to aggregate PVDF resin particles, which was filtrated with membrane filter and washed with water to obtain aqueous wet cake of the PVDF resin particles. The cakes were observed with a scanning electron microscope (SEM) to find: the average primary particle diameter of 123 nm and Coefficient of Variance of 16.9% for particle generation liquid A; the average primary particle diameter of 124 nm and Coefficient of Variance of 16.9% for particle generation liquid B; the average primary particle diameter of 124 nm and Coefficient of Variance of 17.0% for particle generation liquid C. Table 2 shows the result.

Example 21

6 g of KF polymer #9300 made by Kureha Corporation was dissolved with 594 g of Acetonitrile made by Kanto Chemical Co., Inc. in a separable flask of 1 Liter capacity at 80° C. and then 66.6 g of water was added to it to prepare the PVDF resin solution. To prepare particle generation liquid of PVDF resin, 600 g of PVDF resin solution kept at 76° C. continuously flowing through the inner pipe (inner diameter 4 mm×length 200 mm) of a double pipe and 600 g of water kept at room temperature continuously flowing through the outer pipe (inner diameter 9.5 mm×length 1,200 mm) at 166.6 g/min of each flow rate were blended in the outer pipe. 12 g of 10 wt % magnesium acetate solution was added to the particle generation liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 88 nm and Coefficient of Variance of 16.3%. Table 3 shows the result.

TABLE 3

| | PVDF | | Dissolution | Moisture | Particle generation | | Inner pipe diameter/ | Particle | Coefficient |
| --- | --- | --- | --- | --- | --- | --- | --- | --- | --- |
| | Resin kind | Conc. [wt %] | Solvent | temperature [° C.] | percentage [wt %] | temperature [° C.] | Poor solvent | Outer pipe diameter | diameter [nm] | of Variance [%] |
| Example 21 | KF polymer #9300 | 1 | Acetonitrile | 80 | 10 | Room temp. | Water | 4/9.5 | 88 | 16.3 |
| Example 22 | KF polymer #9300 | 1 | Acetonitrile | 80 | 10 | Room temp. | Water | 2/9.5 | 81 | 16.7 |
| Example 23 | KF polymer #9300 | 1 | Acetonitrile | 80 | 10 | Room temp. | Water | 4/16 | 90 | 17.2 |

Example 22

6 g of KF polymer #9300 made by Kureha Corporation was dissolved with 594 g of Acetonitrile made by Kanto Chemical Co., Inc. in a separable flask of 1 Liter capacity at 80° C. and then 66.6 g of water was added to it to prepare the PVDF resin solution. To prepare particle generation liquid of PVDF resin, 600 g of PVDF resin solution kept at 76° C. continuously flowing through the inner pipe (inner diameter 2 mm×length 200 mm) of a double pipe at 166.6 g/min and 150 g of water kept at room temperature continuously flowing through the outer pipe (inner diameter 9.5 mm×length 1,200 mm) at 41.7 g/min were blended in the outer pipe. 12 g of 10 wt % magnesium acetate solution was added to the particle generation liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 81 nm and Coefficient of Variance of 16.7%. Table 3 shows the result.

Example 23

6 g of KF polymer #9300 made by Kureha Corporation was dissolved with 594 g of Acetonitrile made by Kanto Chemical Co., Inc. in a separable flask of 1 Liter capacity at 80° C. and then 66.6 g of water was added to it to prepare the PVDF resin solution. To prepare particle generation liquid of PVDF resin, 600 g of PVDF resin solution kept at 76° C. continuously flowing through the inner pipe (inner diameter 4 mm×length 200 mm) of a double pipe and 600 g of water kept at room temperature continuously flowing through the outer pipe (inner diameter 16 mm×length 1,200 mm) at 333 g/min of each flow rate were blended in the outer pipe. 12 g of 10 wt % magnesium acetate solution was added to the particle generation liquid to aggregate PVDF resin particles, which was filtrated with membrane filter and washed with water to obtain aqueous wet cake of the PVDF resin particles. The cake was observed with a scanning electron microscope (SEM) to find the average primary particle diameter of 90 nm and Coefficient of Variance of 17.2%. Table 3 shows the result.

Example 24

[Dissolution Process]

A stirrer, a thermometer and an internal solution transfer pipe were attached to an autoclave of 1 Liter capacity. A connecting pipe capable of opening and shutting a valve was attached to the transfer pipe. To be used as a receiver tank for flash crystallization, another autoclave of 1 Liter capacity was connected with a stirrer, condenser, gas flow pipe and other end of the connecting pipe (flash crystallization outlet) opposite to the dissolution tank at a position under the liquid in the receiver tank.

In a nitrogen atmosphere, 18 g of PVDF resin made by Sigma-Aldrich Co. LLC. was dissolved with 540 g of NMP made by Mitsubishi Chemical Corporation at 80° C. and then 60 g of water was added to it to prepare PVDF resin solution. The solution was pressurized with nitrogen gas to 0.5 MPa.

[Precipitation Process]

600 g of water was stirred while small amount of nitrogen gas was ventilated in the receiver tank. The valve of the internal connecting pipe of the dissolution tank was opened to deliver PVDF resin solution kept at 80° C. into the receiver tank containing water (room temperature) at atmospheric pressure. Then, 40 g of 5 wt % salt solution was added to the flash liquid and the mixture liquid was stirred for 30 minutes, to be filtrated with membrane filter and washed with water to obtain aqueous wet cake of the PVDF resin particles. The cake was observed to find the average primary particle diameter of 103 nm and Coefficient of Variance of 15.6%. Table 4 shows the result.

Example 25

[Dissolution Process]

A stirrer, a thermometer and an internal solution transfer pipe were attached to an autoclave of 1 Liter capacity. A connecting pipe capable of opening and shutting a valve was attached to the transfer pipe. To be used as a receiver tank for flash crystallization, another autoclave of 1 Liter capacity was connected with a stirrer, condenser, gas flow pipe and other end of the connecting pipe (flash crystallization outlet) opposite to the dissolution tank at a position under the liquid in the receiver tank.

In a nitrogen atmosphere, 12 g of PVDF resin (KF polymer #8500 made by Kureha Corporation) was dissolved with 540 g of NMP made by Mitsubishi Chemical Corporation at 80° C. and then 60 g of water was added to it to prepare PVDF resin solution. The solution was pressurized with nitrogen gas to 0.5 MPa.

[Precipitation Process]

600 g of water was stirred while small amount of nitrogen gas was ventilated in the receiver tank. The valve of the internal connecting pipe of the dissolution tank was opened to deliver PVDF resin solution kept at 80° C. into the receiver tank containing water (room temperature) at atmospheric pressure. Then, 40 g of 5 wt % salt solution was added to the flash liquid and the mixture liquid was stirred for 30 minutes, to be filtrated with membrane filter and washed with water to obtain aqueous wet cake of the PVDF resin particles. The cake was observed to find the average primary particle diameter of 101 nm and Coefficient of Variance of 17.2%. Table 4 shows the result.

Example 26

[Dissolution Process]

A stirrer, a thermometer and an internal solution transfer pipe were attached to an autoclave of 1 Liter capacity. A connecting pipe capable of opening and shutting a valve was attached to the transfer pipe. To be used as a receiver tank for flash crystallization, another autoclave of 1 Liter capacity was connected with a stirrer, condenser, gas flow pipe and other end of the connecting pipe (flash crystallization outlet) opposite to the dissolution tank at a position under the liquid in the receiver tank.

In a nitrogen atmosphere, 12 g of PVDF resin (KF polymer #8500 made by Kureha Corporation) was dissolved with 540 g of Acetonitrile made by Kanto Chemical Co., Inc. at 80° C. and then 60 g of water was added to it to prepare PVDF resin solution. The solution was pressurized with nitrogen gas to 0.5 MPa.

[Precipitation Process]

600 g of water was stirred while small amount of nitrogen gas was ventilated in the receiver tank. The valve of the internal connecting pipe of the dissolution tank was opened to deliver PVDF resin solution kept at 80° C. into the receiver tank containing water (room temperature) at atmospheric pressure. Then, 40 g of 5 wt % salt solution was added to the flash liquid and the mixture liquid was stirred for 30 minutes, to be filtrated with membrane filter and washed with water to obtain aqueous wet cake of the PVDF resin particles. The cake was observed to find the average primary particle diameter of 105 nm and Coefficient of Variance of 16.2%. Table 4 shows the result.

TABLE 4

| | PVDF | | | Dissolution temperature [° C.] | Moisture percentage [wt %] | Particle generation temperature [° C.] | Solution/ Poor solvent | Poor solvent | Particle diameter [nm] | Coefficient of Variance [%] |
|---|---|---|---|---|---|---|---|---|---|---|
| | Resin kind | Conc. [wt %] | Solvent | | | | | | | |
| Example 24 | Reagent made by Aldrich Inc. | 3 | NMP | 80 | 10 | Room temp. | Water | 1 | 103 | 15.6 |
| Example 25 | KF polymer #8500 | 2 | NMP | 80 | 10 | Room temp. | Water | 1 | 101 | 17.2 |
| Example 26 | KF polymer #8500 | 2 | Acetonitrile | 80 | 10 | Room temp. | Water | 1 | 105 | 16.2 |

Comparative Example 1

Figure 2:
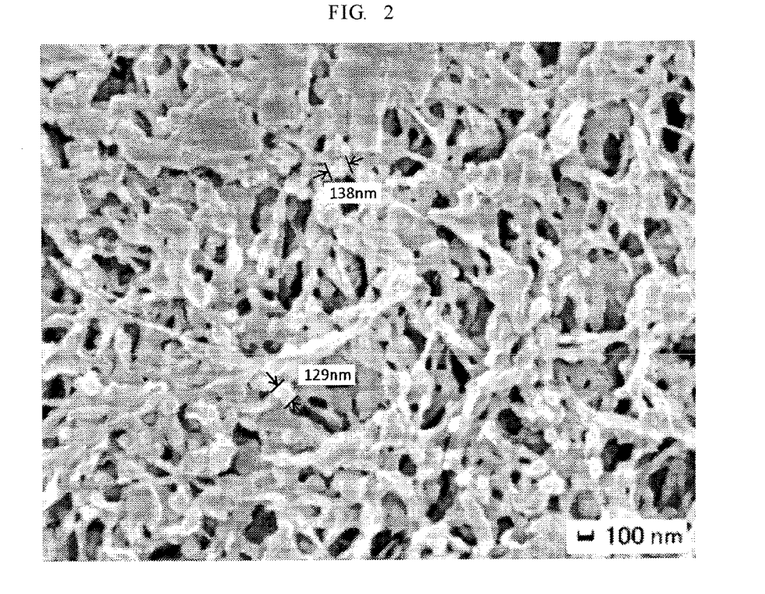
FIG. 2 is a scanning electron microscope image showing PVDF resin particles produced by a conventional method.

18 g of PVDF resin made by Sigma-Aldrich Co. LLC. was dissolved with 600 g of NMP made by Mitsubishi Chemical Corporation at 80° C. to prepare PVDF resin solution. The solution kept at 80° C. was continuously added to a particle generation tank containing 600 g of water at 80° C., so that fusion-bonded strings were obtained instead of particles. Table 1 shows the result. FIG. 2 depicts an image taken by the SEM observation.

Comparative Example 2

12 g of KF polymer #8500 made by Kureha Corporation was dissolved with 600 g of NMP made by Kanto Chemical Co., Inc. at 80° C. to prepare PVDF resin solution. The solution kept at 80° C. was continuously added to a particle generation tank containing 600 g of water at 80° C., so that fusion-bonded strings were obtained instead of particles. Table 1 shows the result.

INDUSTRIAL APPLICATIONS OF THE INVENTION

Our method for producing polyvinylidene fluoride resin particles makes it possible to easily and stably provide substantially surfactant-free PVDF resin particles having an average primary particle diameter of 300 nm or less, particularly 200 nm or less.

The invention claimed is:

1. A production method of polyvinylidene fluoride resin particles comprising:
  (Process a1) a process to precipitate polyvinylidene fluoride resin particles which comprises
    forming a PVDF resin solution of 0.5 to 15 mass % polyvinylidene fluoride resin dissolved in an organic solution consisting of 75 to 97 mass % organic solvent and 3 to 25 mass % water,
    adding the formed PVDF resin solution to a poor solvent of the polyvinylidene fluoride resin, and precipitating polyvinylidene fluoride resin particles; or
  (Process a2) a flash-crystallization process to precipitate polyvinylidene fluoride resin particles which comprises
    forming a PVDF resin solution of 0.5 to 15 mass % polyvinylidene fluoride resin dissolved in an organic solution consisting of 75 to 97 mass % organic solvent and 3 to 25 mass % water; and
    ejecting under increased pressure the formed PVDF resin solution into a poor solvent of the polyvinylidene fluoride resin so as to precipitate polyvinylidene fluoride resin particles,
  wherein the poor solvent of the polyvinylidene fluoride resin is at least one selected from a group consisting of water, mixture of water and acetonitrile, mixture of water and methanol, mixture of water and ethanol and mixture of water and propanol; and wherein the organic solvent is at least one selected from a group consisting of N-methyl-2-pyrrolidinone, dimethyl formamide, dimethyl acetamide, dimethyl sulfoxide, 1,3-dimethyl-2-imidazolizinone and acetonitrile.

2. The production method of polyvinylidene fluoride resin particles according to claim 1, which comprises conducting Process a1 and Process a2.

3. The production method of polyvinylidene fluoride resin particles according to claim 1, which comprises conducting Process a1 continuously.

4. The production method of polyvinylidene fluoride resin particles according to claim 1, wherein the organic solvent is N-methyl-2-pyrrolidinone or acetonitrile.

5. The production method of polyvinylidene fluoride resin particles according to claim 1, wherein the polyvinylidene fluoride resin particles have an average primary particle diameter of 30 nm or more and less than 300 nm.

6. The production method of polyvinylidene fluoride resin particles according to claim 1, wherein the polyvinylidene fluoride resin particles have a coefficient of variance of 20% or less.

* * * * *